United States Patent Office 3,234,276
Patented Feb. 8, 1966

---

3,234,276
N-ACYL-N-(TRIALKOXYPHENYLALKYLENE)-
ALKYLENEDIAMINES
Francis J. Petracek, Canoga Park, Calif., assignor to Rexall Drug and Chemical Company, Los Angeles, Calif., a corporation of Delaware
No Drawing. Filed Apr. 12, 1963, Ser. No. 272,558
3 Claims. (Cl. 260—558)

This invention relates to compositions of matter classified in the art of chemistry as substituted alkylenediamines.

The invention sought to be patented is described as residing in the concept of a chemical compound having the formula

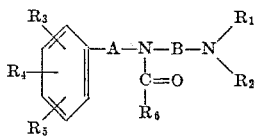

wherein A and B are lower alkylene groups, $R_1$ and $R_2$ are lower alkyl or when taken with the amino nitrogen atom form a 5 to 6 membered heterocyclic ring, $R_3$ is lower alkoxy, $R_4$ and $R_5$ are hydrogen or lower alkoxy, and $R_6$ is lower alkyl or phenyl, and to the pharmaceutically acceptable non-toxic acid addition and quaternary ammonium salts thereof.

As used throughout the specification and in the claims, the terms "lower alkylene," "lower alkyl" and "lower alkoxy" embrace straight and branched chain alkylene, alkyl and alkoxy groups, respectively, containing 1 to 6 carbon atoms and the terms "5 to 6 membered heterocyclic ring" embraces 5 to 6 membered rings linked to the B alkylene chain through a nitrogen atom, such as piperidino, pyrrolidino, morpholino, piperazino, thiomorpholino and the like.

The tangible embodiments of this invention possess the inherent general physical characteristics of being, in the form of their acid addition salts, crystalline compounds. Analytical and spectral data, taken together with the nature of the starting materials and mode of synthesis, positively confirm the structure of the compounds sought to be patented.

The tangible embodiments of this invention possess the inherent applied use characteristics of having significant central nervous system depressant activity as determined by recognized and accepted pharmacological test procedures.

The manner and process of making and using the invention will now be generally described so as to enable one skilled in the art of chemistry to make and use the same as follows:

The starting materials for the preparation of the compounds of this invention having the formula

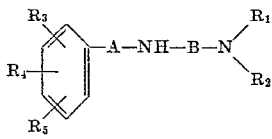

wherein $R_1$, $R_2$, $R_3$, $R_4$, $R_5$, A and B are as described above are readily prepared by methods well known in the art of chemistry. U.S. Patent 2,582,292 describes one reaction sequence leading to the starting materials. Alternately, refluxing of the compounds described and claimed in U.S. Patent 2,956,081 with an alkali metal aluminohydride, such as lithium aluminum hydride in the presence of an inert solvent such as tetrahydrofuran yields the desired starting materials.

The compounds of this invention are prepared in several ways, depending upon the nature of the $R_6$ substituent. Where $R_6$ is lower alkyl, treatment of the starting material with an anhydride of the formula

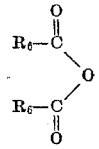

at 0° C. yields the desired compounds. Where $R_6$ is phenyl, treatment of the starting materials with benzoyl chloride in accordance with the Schotten-Baumann reaction is effective.

The tangible embodiments of this invention can, if desired, be converted into their non-toxic pharmaceutically acceptable acid-addition or quaternary ammonium salts by conventional procedures. Typical acid addition salts include the hydrochloride, hydrobromide, citrate, maleate, sulfate, nitrate and the like. Typical quaternary ammonium salts are those formed with such alkyl halides as methyl iodide, N-hexyl bromide and the like.

The tangible embodiments of this invention either as the free base or in the form of a non-toxic pharmaceutically acceptable acid-addition or quaternary ammonium salt, can be combined with conventional pharmaceutical diluents and carriers, to form such dosage forms as tablets, capsules, solutions, suspensions, suppositories and the like.

The best mode contemplated by the inventor of carrying out this invention will now be set forth as follows:

EXAMPLE 1

(a) *N,N-diethyl-N'-(3,4,5-trimethoxybenzyl)-ethylenediamine*

3,4,5-trimethoxybenzoyl glycine diethylamide (24 g., 75 meq.) prepared as described in U.S. Patent 2,956,081 is added to 7.6 g. (200 mmole) of lithium aluminum hydride in 350 ml. of tetrahydrofuran. The resulting solution is refluxed for five hours. The reaction is then quenched and 15.5 g. of a viscous oil is recovered which is converted to the hydrochloride and recrystallized from methanol/acetone to give 14 g. (51%) of colorless needles, M.P. 171–174° C.

*Analysis.*—Calculated for $C_{16}H_{30}O_3N_2Cl_2$: C, 52.04%; H, 8.19%; N, 7.59%; Cl, 19.20%. Found: C, 5.19%; H, 8.2%; N, 7.51%; Cl, 19.0%.

(b) *N-acetyl-N-(3,4,5-trimethoxybenzyl)-N',N'-diethylethylenediamine*

20 g. (0.024 mole) of the amine hydrochloride, formed as described in Example (a) above, is converted to the free base and to it is then added 20 g. (0.2 mole) of acetic anhydride (~0° C.). After stirring at 0° C. for about 16 hours the solution is poured over ice, basified to pH 11 and extracted with ether. The oily base recovered is converted to the crystalline picrate in ethanol. Yield: 11.2 g. (81%), M.P. 132°–133.5° C.

*Analysis.*—Calculated for $C_{24}H_{33}N_5O_{11}$: C, 50.79%; H, 5.86%; N, 12.34%. Found: C, 51.18%; H, 6.05%; N, 12.36%.

The picrate is reconverted to the free base and then neutralized and dissolved in dilute hydrochloric acid to form the hydrochloride.

The following example illustrates the preparation of a further embodiment.

EXAMPLE 2

*N-benzoyl-N-(3,4,5-trimethoxybenzyl)-N',N'-diethylethylenediamine*

7.5 g. (0.024 mole) of N,N-diethyl-N'-(3,4,5-trimethoxybenzyl) ethylenediamine obtained as described in Example -(a) is treated with 14 g. (0.1 mole) of benzoyl chloride according to the Schotten-Baumann procedure. The picrate of the reaction product is obtained in a yield of 13 g. (85%), M.P. 145–146.5° C.

*Analysis.*—Calculated for $C_{29}H_{35}O_{11}N_5$: C, 55.32%; H, 5.61%; N, 11.12%. Found: C, 55.19%; H, 5.46%; N, 10.96%.

The picrate is converted to the hydrochloride by the process described in Example 1(b).

The subject matter which the applicant regards as his invention is particularly pointed out and distinctly claimed as follows:

1. A member selected from the group consisting of compounds of the formula

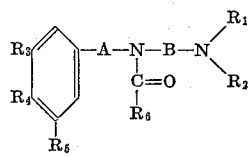

wherein $NR_1R_2$ is a member selected from the group consisting of di-lower alkylamino, piperidino, pyrrolidino, morpholino, piperazino and thiomorpholino, $R_3$, $R_4$ and $R_5$ are lower alkoxy, $R_6$ is a member selected from the group consisting of lower alkyl and phenyl, and A and B are lower alkylene, and the pharmaceutically acceptable non-toxic acid-addition and alkyl halide quaternary ammonium salts thereof.

2. N - acetyl - N - (3,4,5 - trimethoxybenzyl) - N',N'-diethylethylenediamine.

3. N - benzoyl - N - (3,4,5 - trimethoxybenzoyl) - N', N'-diethylethylenediamine.

References Cited by the Examiner
UNITED STATES PATENTS 2,654,758 10/1953 Papa et al. _____ 260—558
3,016,382 1/1962 Wright et al. _____ 260—247.2

WALTER A. MODANCE, *Primary Examiner.*

NICHOLAS S. RIZZO, *Examiner.*